Patented Jan. 7, 1947

2,413,917

UNITED STATES PATENT OFFICE 2,413,917

MERCAPTO NITRILES

Marion W. Harman, Nitro, W. Va., assignor to Monsanto Chemical Company, St. Louis, Mo., a corporation of Delaware No Drawing. Application April 3, 1943, Serial No. 481,745

4 Claims. (Cl. 260—465)

The present invention relates to a new class of chemical compounds and to a process for making them.

It has been found in accordance with this invention that organic mercaptans combine readily with alpha beta unsaturated open chain nitriles. The reaction appears to be a general one undergone by any organic compound containing a mercapto group or capable of existing in a form having a free mercapto group. Thus, alkyl mercaptans, aromatic mercaptans or thio phenols, aliphatic mercapto thiazoles, arylene mercapto thiazoles, mercapto thiazolines, dithiocarbamic acids, thiourea and substituted thioureas have been found to condense with unsaturated nitriles. Examples of suitable nitriles comprise acrylonitrile, alpha chlorocrylonitrile, 1-cyanobutadiene-1,3, methacrylonitrile and crotonic nitrile although the invention is not limited thereto. Any alpha beta unsaturated open chain nitrile or nitrile isomerizing to this form can be used. The products apparently are direct addition products and are valuable as intermediates in the preparation of the corresponding acids and amines and are useful as insecticides and for other purposes.

The reactions take place very readily in the presence of an alkaline condensing agent. They are effected most conveniently by adding the nitrile to an aqueous alkaline solution of the mercaptan in which case the alkali serves as solubilizing agent as well as catalyst. However, if desired the reaction may be carried out in an inert solvent as for example benzene or dioxane in the presence of a small amount of any strongly alkaline agent as for example alkali oxides, alcoholates, amides and strongly alkaline quaternary ammonium hydroxides. While it is generally unnecessary to add the nitrile slowly, it is desirable to prevent the temperature of the reaction mixture from rising unduly. The reactions are exothermic but can easily be controlled by occasional external cooling or if preferred by controlling the rate of addition of the nitrile. The products vary from oils to solids and analysis indicates that they are formed in accordance with the following general equation

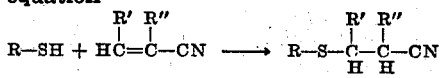

where R is an organic group, R' is hydrogen or a hydrocarbon group and R" is hydrogen, chlorine or a methyl group.

The following examples are illustrative of the invention but are not to be regarded as limiting the invention.

Example I

Substantially 16 parts by weight of acrylonitrile (approximately 0.3 molecular proportion) was added to 468 parts by weight of an aqueous solution containing substantially 0.3 molecular proportion of the sodium salt of mercaptobenzothiazole. The reaction was carried out in a glass vessel fitted with a stirrer and reflux condenser. The charge was stirred for two hours and allowed to stand until the precipitate which separated had settled out. The pale yellow crystals were filtered off, washed and dried. The crystalline product had a melting point of 162-165° C. and analysis showed it to be 2-(β-cyano ethyl mercapto) benzothiazole of the formula

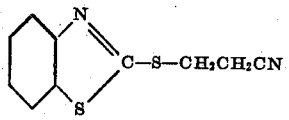

Required nitrogen 12.73% and sulfur 29.09%; found 12.76% nitrogen and 28.44% sulfur.

Example II

Substantially 59.5 parts by weight of 2-mercapto thiazoline (substantially 0.5 molecular proportion) were stirred with 80 parts by weight of 25% caustic soda and 200 parts by weight of water, at 40° C. until solution was complete. A small amount of insoluble residue was filtered off, the solution cooled to room temperature and a small amount of decyl benzene sodium sulfonate or other suitable wetting agent added. Substantially 26.5 parts by weight of acrylonitrile was added and the charge stirred for about two hours keeping the temperature below 30° C. by external cooling when necessary. The oil layer was separated, washed with hot water until free of alkali and dried. The residue after removal of the solvent was a straw colored oil very soluble in benzene and chloroform but of very limited solubility in ether and alcohol. Analysis showed it to be 2(β-cyano ethyl mercapto) thiazoline of the structure

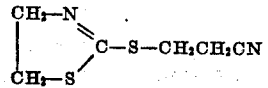

The yield was about 70%. Required nitrogen 16.28% and sulfur 37.21%; found 16.32% nitrogen and 36.35% sulfur.

The reaction of 2-mercapto 4-methyl thiazole and acrylonitrile in similar manner resulted in a product in the form of soft pale yellow oily crystals believed to be 2(β-cyano ethyl mercapto) 4 methyl thiazole.

Example III

A solution containing 0.5 molecular proportion of the sodium salt of dibutyl dithiocarbamic acid was prepared by adding 38 parts by weight of carbon disulfide to 64.5 parts by weight of dibutyl amine (substantially 0.5 molecular proportion), 80 parts by weight of 25% caustic soda and 300 parts by weight of water. The reaction mixture was kept at 15–20° C. during the addition of the carbon disulfide and then substantially 26.5 parts by weight of acrylonitrile added while keeping the temperature below 30° C. An oily layer soon separated which was drawn off, dissolved in ether or other solvent and washed free of alkali. The ether solution was dried over calcium chloride and the solvent removed by evaporation. The residue was a straw colored oil, believed to be β-cyano ethyl N,N dibutyl dithiocarbamate of the structure

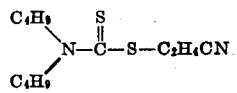

$C_{12}H_{22}N_2S_2$ requires 24.80% sulfur and 10.85% nitrogen; found 24.42% sulfur and 10.83% nitrogen. The yield was 82.5%.

The above procedure was repeated substituting 90 parts by weight of 25% aqueous dimethyl amine (substantially 0.5 molecular proportion) for the dibutyl amine. After the addition of the acrylonitrile the charge was stirred for about three hours. A straw colored oil separated which crystallized on standing to a colorless acid, M. P. 40–42° C. The product contained 16.07% nitrogen and 35.14% sulfur. The calculated values for β-cyano ethyl N,N dimethyl dithiocarbamate of the structure

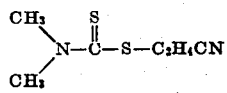

are 16.09% nitrogen and 36.78% sulfur.

Example IV

A solution of the sodium salt of cyclopentamethylene dithiocarbamic acid was prepared by adding 22.8 parts by weight (substantially 0.3 molecular proportion) of carbon disulfide to 26.8 parts by weight of 95% piperidine (substantially 0.3 molecular proportion), 48 parts by weight of 25% caustic soda and 200 parts by weight of water. The carbon disulfide was added at 18–20° C. and followed by 16 parts by weight of acrylonitrile (substantially 0.3 molecular proportion). The temperature rose appreciably during the addition of the latter but was kept below about 40° C. Stirring was continued for about three hours and the colorless crystals which had separated were filtered off, washed and dried. The product had a melting point of 80–82° C. and was believed to be β-cyano ethyl cyclopentamethylene dithiocarbamate of the structure

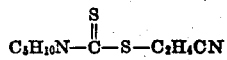

$C_9H_{14}N_2S_2$ requires 29.90% sulfur and 13.08% nitrogen; found 29.50% sulfur and 13.13% nitrogen. The yield as 61%.

Example V

In a container of suitable capacity fitted with a reflux condenser and stirrer there was charged 33 parts by weight of thio phenol (substantially 0.3 molecular proportion), 48 parts by weight of 25% caustic soda and 150 parts by weight of water. 16 parts by weight of acrylonitrile was then added (substantially 0.3 molecular proportion) keeping the temperature at 31–43° C. during the addition. The charge was stirred for about 16 hours and the oil layer drawn off, washed with water until free of alkali and dried over anhydrous sodium sulfate. The colorless heavy oil (90% yield) was distilled under reduced pressure. The fraction boiling at 148–153° C./5 mm. contained 8.62% nitrogen and 19.09% sulfur. The values calculated for β-phenyl-mercapto propionitrile

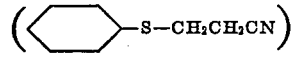

were 8.59% nitrogen and 19.63% sulfur.

The foregoing procedure was repeated substituting 0.3 molecular proportion of technical thio β naphthol for the thio phenol. A colorless oil, B. P. 207–208°/4 mm. was isolated which contained 7.16% nitrogen and 14.62% sulfur. The calculated values for β(β-naphthyl) mercapto propionitrile, $C_{13}H_{11}NS$ are 6.57% nitrogen and 15.02% sulfur.

Example VI

Substantially 13.3 parts by weight of acrylonitrile (substantially 0.25 molecular proportion) was added to a rapidly stirred charge consisting of 31 parts by weight (substantially 0.25 molecular proportion) of p-thio cresol, 40 parts by weight of 25% caustic soda and 150 parts by weight of water. The temperature of the reaction mixture was 30–42° C. during the reaction of the nitrile. Stirring was continued for about three hours after the nitrile had been added and the oil layer then separated, washed and dried. The fraction boiling at 150–153° C./4 mm. was a colorless oil which contained 8.03% nitrogen and 18.05% sulfur. The values calculated for β-p-tolyl mercapto propionitrile, $C_{10}H_{11}NS$, were 7.91% nitrogen and 18.08% sulfur. The yield of the pure compound was about 74%.

Example VII 45 parts by weight of butyl mercaptan (substantially 0.5 molecular proportion), 80 parts by weight of 25% caustic soda and 150 parts by weight of water were charged into a container of suitable capacity fitted with a stirrer and reflux condenser. Substantially 26.5 parts by weight (substantially 0.5 molecular proportion) of acrylonitrile was added and the reaction mixture cooled to keep the temperature below about 55° C. Stirring was continued for about an hour after which the oil layer was separated, washed free of alkali, dried and distilled. A water white oil boiling at 105–110° C./4 mm. was collected. This contained 9.95% nitrogen and 22.18% sulfur. The values calculated for β-butyl mercapto propionitrile, $C_7H_{13}NS$ were 9.79% nitrogen and 22.38% sulfur. The yield was 90% based on the crude product and about 80% based on the pure distilled fraction.

Example VIII

A solution containing substantially one molecular proportion of caustic soda was prepared by mixing 160 parts by weight of 25% caustic soda and 300 parts by weight of water. The aqueous caustic solution was cooled to 5° C. and 62 parts by weight (substantially one molecular proportion) of ethyl mercaptan added keeping the temperature below 20° C. 53 parts by weight of acrylonitrile was then added (substantially 1 molecular proportion) and the charge stirred for about an hour, keeping the temperature below 30° C. throughout. The upper oil layer was then drawn off, dissolved in ether or other solvent, and the solvent extracts washed free of alkali and dried over calcium chloride. The solvent was evaporated and the residue distilled under reduced pressure. A water white mobile oil was collected boiling at 88–93° C./4 mm. It contained 12.20% nitrogen and 27.53% sulfur. The calculated values for β ethyl mercapto propionitrile, $C_5H_9NS$ are 12.17% nitrogen and 27.83% sulfur. The yield was about 85%.

Example IX

Substantially 64.5 parts by weight (substantially 0.85 molecular proportion) of n-propyl mercaptan was added with cooling to an admixture of 136 parts by weight of 25% caustic soda and 250 parts by weight of water. The temperature was kept below 25° C. during the addition of the mercaptan. 45 parts by weight (substantially 0.85 molecular proportion) of acrylonitrile was then added and the mixture stirred for about an hour. The temperature was not permitted to rise above 30° C. during the reaction. The oil layer was then separated, dissolved in ether or other solvent, washed free of alkali and dried. The solvent was removed by distillation and the residue distilled under diminished pressure. A water white mobile oil was obtained boiling at 95–100° C./4 mm. The yield was about 78%. Analysis gave 11.02% nitrogen and 24.59% sulfur. The calculated values for β-n-propyl mercapto propionitrile, $C_6H_{11}NS$, are 10.85% nitrogen and 24.80% sulfur.

The same product was prepared by mixing 6.0 parts by weight of propyl mercaptan, 2 parts by weight of 25% caustic soda, 25 parts by weight of water and 4.2 parts by weight of acrylonitrile. The charge was mixed with occasional external cooling to prevent an undue rise of temperature. After a short time no mercaptan odor remained and the upper oily layer was drawn off and dissolved in ether or other solvent, washed free of alkali and dried. The solvent and any unreacted acrylonitrile or mercaptan were removed by distillation leaving the β-n-propyl mercapto propionitrile as the residue. The yield was about 74%.

Example X

Substantially 38 parts by weight (substantially 0.5 molecular proportion) of thiourea was dissolved in 250 parts by weight of an aqueous solution containing substantially 20 parts by weight of caustic soda. 26.5 parts by weight (substantially 0.5 molecular proportion) of acrylonitrile was added keeping the temperature below 30° C. The reaction mixture was stirred for about three hours and then neutralized with 61 parts by weight of 40% sulfuric acid (pH 5) the temperature being kept below 30° C. throughout the stirring period and neutralization. The mixture was allowed to stand several hours and a very small amount of a brown oil which separated was removed. The aqueous solution was filtered and the clear solution evaporated by gentle warming. The residue was taken up in alcohol, filtered from the sodium sulfate and the solvent again evaporated by gentle warming and finally, the last traces removed by heating to 100° C. under 4 mm. pressure. The product was a viscous amber oil when hot but on standing formed oily nearly colorless crystals. The product could not be identified positively but is believed to be simply an addition product of one molecular equivalent of thiourea and one molecular equivalent of acrylonitrile. The yield on this basis was about 94%.

Example XI

Substantially 57 parts by weight (substantially 0.25 molecular proportion) of thiocarbanilide was dissolved in a dilute aqueous solution of alcohol and caustic soda consisting of 40 parts by weight of 25% caustic soda and 237 parts by weight of ethyl alcohol while keeping the temperature below 25° C. 13.3 parts by weight (substantially 0.25 molecular proportions) of acrylonitrile were then added and the mixture stirred for about 2 hours, filtered from a trace of sediment and neutralized with 31 parts by weight of 40% sulfuric acid (pH 7). Throughout the reaction and the neutralization the temperature was kept below about 25° C. The neutral mixture was filtered from the sodium sulfate and any unreacted thiocarbanilide and the solvent evaporated by gentle heating. The residue was dissolved in alcohol, filtered from any sodium sulfate or other impurity still remaining and again evaporated, finally by heating to 100° C. under 4 mm. pressure. An amber syrup was obtained believed to be an addition product of one molecular equivalent of thiocarbanilide and one molecular equivalent of acrylonitrile. On analysis it was found to contain 14.35% nitrogen and 10.23% sulfur. The values calculated for $C_{16}H_{15}N_3S$ are 14.94% nitrogen and 11.38% sulfur.

Example XII

Substantially 54.5 parts by weight of technical dodecyl mercaptan analyzing 14.7% mercaptan content (substantially 0.25 molecular proportion) was added to an admixture of 40 parts by weight of 25% caustic soda and 150 parts by weight of water. Substantially 13.3 parts by weight (substantially 0.25 molecular proportions) of acrylonitrile and a small amount of a suitable wetting agent as for example decyl benzene sodium sulfonate were then added with efficient stirring. A slightly exothermic reaction set in, the temperature rising to 42° C. Stirring was continued for 16 hours and the upper oily layer drawn off, washed with water until free of alkali and dried by heating at 100° C. under 10 mm. pressure. The residue was purified by distillation. After two fractional distillations a very pale yellow oil was obtained boiling at 160–185° C./5 mm. Analysis gave 5.68% nitrogen and 13.13% sulfur. The calculated values for β-dodecyl mercapto propionitrile, $C_{15}H_{29}NS$, are 5.49% nitrogen and 12.55% sulfur.

What is claimed is:

1. As a new compound a β-arylmercapto propionitrile.
2. As a new compound β-phenylmercapto propionitrile.
3. As a new compound β-butylmercapto propionitrile.
4. As a new compound β-naphthylmercapto propionitrile.

MARION W. HARMAN.

Certificate of Correction

Patent No. 2,413,917.  January 7, 1947.

MARION W. HARMAN

It is hereby certified that error appears in the printed specification of the above numbered patent requiring correction as follows: Column 6, line 65, for "β-butylmercapto" read *β-tolylmercapto*; and that the said Letters Patent should be read with this correction therein that the same may conform to the record of the case in the Patent Office.

Signed and sealed this 8th day of April, A. D. 1947.

[SEAL]

LESLIE FRAZER,
*First Assistant Commissioner of Patents.*